United States Patent [19]

Pohlig

[11] Patent Number: 4,782,754

[45] Date of Patent: Nov. 8, 1988

[54] MECHANISM HAVING INK RESERVOIR WITH ELECTRODES FOR INK MONITORING IN INK PRINTER DEVICES

[75] Inventor: Dietmar Pohlig, Munich, Fed. Rep. of Germany

[73] Assignee: Siemens Aktiengesellschaft, Berlin and Munich, Fed. Rep. of Germany

[21] Appl. No.: 941,862

[22] Filed: Dec. 15, 1986

[30] Foreign Application Priority Data

Mar. 7, 1986 [DE] Fed. Rep. of Germany ....... 3607576

[51] Int. Cl.⁴ ......................... B41F 31/02; G05D 9/00

[52] U.S. Cl. .................................................... 101/364

[58] Field of Search ........ 101/366, 364, 350, 207–210; 346/140 R; 73/304 R, 304 C

[56] References Cited

U.S. PATENT DOCUMENTS 4,222,267 9/1980 Aldrich ............................ 73/304 C 4,390,793 6/1983 John ................................ 73/304 R

FOREIGN PATENT DOCUMENTS 1174395 12/1969 United Kingdom .............. 73/304 C

*Primary Examiner*—J. Reed Fisher

*Attorney, Agent, or Firm*—Steadman & Simpson Hill, Van Santen

[57] ABSTRACT

The monitoring of the ink supply in an ink reservoir occurs by measurement and evaluation of the change in resistance between two electrodes situated in the inside of the ink reservoir, the one electrode being formed by the hollow needle which produces a flow connection between the ink reservoir and ink supply system; the second electrode is formed as a needle and is situated in a wall of the reservoir and is arranged in an insulating ring which is formed by walls of the ink reservoir which are drawn up toward the inside.

2 Claims, 1 Drawing Sheet

MECHANISM HAVING INK RESERVOIR WITH ELECTRODES FOR INK MONITORING IN INK PRINTER DEVICES

BACKGROUND OF THE INVENTION

1. Field of the Invention

The invention relates to a mechanism for ink monitoring by acquiring the level-dependent change in resistance between two electrodes in ink printer devices.

2. Description of the Prior Art

Ink printer devices require an ink reservoir from which the ink is supplied to the individual write nozzles directly and bubble-free. Current ink reservoirs are provided as replaceable parts, whereby the flow connection between the ink reservoir and the ink printer device occurs through a hollow needle which penetrates a sealing element when the ink reservoir is put in place. Monitoring the filling level of the ink reservoir is accorded great significance. One of the reasons for this is that air can enter into the ink supply system via a completely empty reservoir, this air leading to a considerable operating malfunction.

In a known mechanism for monitoring the supply of writing fluid in an ink reservoir, two electrodes are employed via which a change in resistance dependent on the level of the fluid in the reservoir is acquired and is evaluated in a circuit arrangement (U.S. Pat. No. 4,202,267). In accord with this prior art, the one electrode is formed by the hollow needle which produces a connection between the ink supply system and the ink reservoir. A rivet secured in the floor of the ink reservoir serves as the second electrode. The second electrode can also be formed in that at least the floor part of the ink reservoir is coated with an electrically conductive layer. When the ink volume in the ink reservoir is diminished, the electrical resistance between the electrodes increases, this leading to the initiation of a warning apparatus in the following circuit arrangement and leading to the output of a warning signal.

In the known apparatus, the second electrode is conducted parallel to the hollow needle through the sealing element. This frequently leads to problems, since the material stressing of the extremely small sealing element becomes so great as a result thereof that an absolutely ink-tight closure is no longer guaranteed. Particularly when the ink reservoir is not placed on the hollow needle from above, but, on the contrary, is put in place in a horizontal direction, problems derive since the second electrode must be conducted through the sealing element in the immediate proximity of the hollow handle.

SUMMARY OF THE INVENTION

An object of the invention is to specify a mechanism for ink monitoring with which the stressing of the sealing element is reduced to such a degree that leaks no longer occur.

This object is achieved by forming the second electrode as a metal needle which is conducted through a wall of the ink reservoir and is arranged in an insulating ring formed by shaped portions of the wall drawn up toward the insides.

The advantages of the invention are that a great reliability against ink emergence in the region of the sealing element is guaranteed and in that the mechanism can be utilized with particular advantage in ink printer devices wherein the ink reservoir is placed onto the ink printer device in horizontal direction, when, thus, the ink reservoir is arranged such that the longitudinal axis of the hollow needle proceeds roughly parallel with the ink surface in the ink reservoir.

BRIEF DESCRIPTION OF THE DRAWINGS

Details of the invention shall be set forth below with reference to an exemplary embodiment shown in the drawings.

DESCRIPTION OF THE PREFERRED EMBODIMENTS

Figure 1:
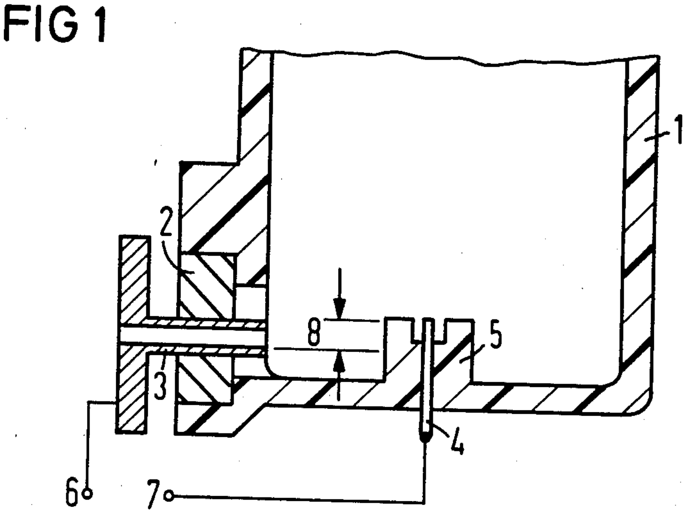
FIG. 1 is a side sectional view of an ink reservoir embodying the principles of the present invention.

The exemplary embodiment illustrated in FIG. 1 shows a section through a plastic reservoir 1 which includes a sealing element 2 in its walls. The sealing element is composed of elastic material and is penetrated by a hollow needle 3 when the ink reservoir 1 is put in place on the ink supply system of the write head part (not shown here) of the ink printer device. The hollow needle 3 is a component part of the write head structure. The plug-on direction of the ink reservoir 1 onto the actual write head of the ink printer device ensues in horizontal direction here, i.e. the longitudinal axis of the hollow needle 3 proceeds roughly parallel to the ink surface in the ink reservoir 1. The hollow needle 3 thereby forms the one electrode which is connected to a terminal 6 of an evaluation circuit (not shown here). Such an evaluation circuit can be constructed as disclosed in U.S. Pat. No. 4,202,267. A metal needle 4 which is arranged in the floor part of the ink reservoir 1 is provided as second electrode. The metal needle 4 is thereby conducted through the floor part of the ink reservoir 1 and is situated in an insulating ring 5 formed by shaped portions of the floor part which are drawn up in an inward direction within the reservoir. The metal needle 4 is connected to the second terminal 7 of the evaluation circuit for the acquisition and evaluation of a change in resistance. The insulating ring 5 not only increases the mechanical stability, but, over and above this, also serves the purpose of improving the sealing in the region of the penetration of the metal needle 4. The upper edge of the insulating ring 5 and, thus, the upper edge of the metal needle 4 as well lie higher than the lowest point of the hollow needle 3 penetrating the sealing element 2. The height difference thereby formed is referenced 8 in the drawings. When the level of the ink fluid in the ink reservoir then sinks to such a degree that it falls below the upper edge of the metal needle, then the connection between the metal needle 4 and the ink in the ink reservoir is interrupted, whereas the hollow needle is still in contact with ink at the same time. The resistance between the metal needle 4 and the hollow needle 3, i.e. the resistance between the two electrodes that are connected to the terminals 6 and 7 of the evaluation circuit is thereby changed to a considerable degree, for example, from the k-ohm range into the mega-ohm range. This change in resistance is acquired by the evaluation circuit in a known way and leads to the output of a warning signal. The height difference 8 between the upper edge of the metal needle 4 and the lowest point of the hollow needle 3 is also a measure at the same time for the volume of ink still remaining.

Dependent thereon, an end of ink signal can also be output by a known circuit having a time-delaying effect, the overall ink printer device, for example, then being automatically shut off with this end of ink signal.

Figure 2:
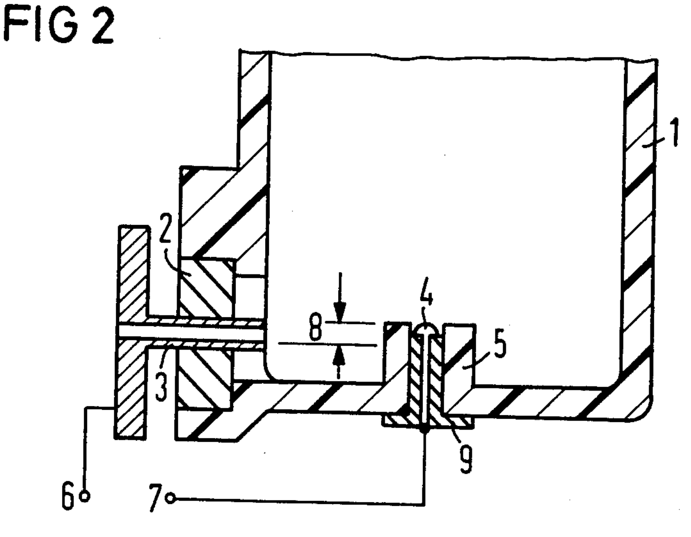
FIG. 2 is a side sectional view of an alternative embodiment of an ink reservoir embodying the principles of the present invention.

As shown by way of example in FIG. 2, it is also possible within the framework of the invention to provide an ink-tight, elastic formed part 9 in the region of the insulating ring 5 for the acceptance and holding of the metal needle 4, the metal needle 4 serving as cooperating electrode being capable of being pressed into or glued into this formed part 9.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A mechanism for ink monitoring by acquiring the level-dependent change of resistance between two electrodes in ink printer devices wherein a hollow needle penetrating a sealing element is provided for the connection between an ink reservoir and an ink supply system, this hollow needle simultaneously forming a first electrode, comprising the improvement wherein the sealing element and hollow needle are arranged in a side wall of the ink reservoir and a second electrode is a metal needle which is conducted through a floor part of the ink reservoir and is arranged in an insulating ring formed by shaped portions of the floor drawn up toward the inside of the reservoir, and an upper edge of the insulating ring is at a higher level than a lowest point of the hollow needle penetrating the sealing element.

2. A mechanism according to claim 1, wherein an ink-tight elastic formed part is provided in the region of the insulating ring for accepting and for holding the metal needle.

* * * * *